(12) United States Patent
Lansing (10) Patent No.: US 8,880,670 B1
(45) Date of Patent: Nov. 4, 2014

(54) GROUP MEMBERSHIP DISCOVERY SERVICE

(75) Inventor: Lawrence Lansing, Mountain View, CA (US)

(73) Assignee: Google Inc., Mountain View, CA (US)

(*) Notice: Subject to any disclaimer, the term of this patent is extended or adjusted under 35 U.S.C. 154(b) by 600 days.

(21) Appl. No.: 13/076,283

(22) Filed: Mar. 30, 2011

(51) Int. Cl.
```
G06F 7/00       (2006.01)
G06F 15/16      (2006.01)
G06F 15/173     (2006.01)
H04L 12/28      (2006.01)
H04L 29/08      (2006.01)
H04L 29/06      (2006.01)
H04L 29/12      (2006.01)
H04L 12/18      (2006.01)
H04L 12/24      (2006.01)
```

(52) U.S. Cl.
CPC ........ *H04L 67/1044* (2013.01); *H04L 67/1068* (2013.01); *H04L 67/1063* (2013.01); *H04L 67/1061* (2013.01); *H04L 67/1059* (2013.01); *H04L 67/1048* (2013.01); *H04L 67/1046* (2013.01); *H04L 29/12047* (2013.01); *H04L 12/185* (2013.01); *H04L 61/1541* (2013.01); *H04L 63/10* (2013.01); *H04L 29/12009* (2013.01); *H04L 12/1822* (2013.01); *H04L 41/0663* (2013.01); *H04L 29/12113* (2013.01)
USPC ........... 709/223; 370/254; 370/255; 707/625; 709/204; 709/224

(58) Field of Classification Search
CPC ............ H04L 67/1044; H04L 67/1046; H04L 67/1048; H04L 12/185; H04L 12/1822; H04L 29/12009; H04L 29/12047; H04L 29/12113; H04L 61/1541; H04L 63/10; H04L 67/1063; H04L 67/1061; H04L 67/1059; H04L 67/1068; H04L 41/0663
USPC ................. 709/204, 223, 224; 370/254, 255; 707/625

See application file for complete search history.

(56) References Cited

U.S. PATENT DOCUMENTS

| | | | | |
|---|---|---|---|---|
| 5,323,384 | A * | 6/1994 | Norwood et al. | 370/254 |
| 6,216,150 | B1 * | 4/2001 | Badovinatz et al. | 718/106 |
| 6,363,495 | B1 * | 3/2002 | MacKenzie et al. | 714/4.5 |
| 6,393,485 | B1 * | 5/2002 | Chao et al. | 709/231 |
| 6,411,967 | B1 * | 6/2002 | Van Renesse | 707/625 |

(Continued)

OTHER PUBLICATIONS

BitTorrent tracker—Wikipedia, the free encyclopedia [online]. [retrieved Mar. 30, 2011]. Retrieved from the Internet: http://en.wikipedia.org/wiki/BitTorrent_tracker, 4 pages.

(Continued)

*Primary Examiner* — Daniel C Murray
(74) *Attorney, Agent, or Firm* — Fish & Richardson P.C.

(57) ABSTRACT

Methods, systems, and apparatus, including computer programs encoded on a computer storage medium, for providing a group membership discovery service. Join requests are received from clients, including a respective group and value pair. A respective count for each received pair is updated, the count indicating a count of a join events received by servers for the pair. Notification is sent to one or more other clients that have requested such notification, wherein the notification includes a first group and value pair having a respective count that was updated for a first time. A notification is received from a server regarding a different second group and value pair received by the server and a respective count for the second group and value pair is updated.

30 Claims, 7 Drawing Sheets

(56) References Cited

U.S. PATENT DOCUMENTS

| | | | |
|---|---|---|---|
| 6,438,705 B1* | 8/2002 | Chao et al. | 714/4.11 |
| 6,493,716 B1* | 12/2002 | Azagury et al. | 1/1 |
| 6,532,494 B1* | 3/2003 | Frank et al. | 709/224 |
| 6,801,949 B1* | 10/2004 | Bruck et al. | 709/232 |
| 6,839,752 B1* | 1/2005 | Miller et al. | 709/224 |
| 6,963,543 B2* | 11/2005 | Diep et al. | 370/261 |
| 7,039,694 B2* | 5/2006 | Kampe et al. | 709/222 |
| 7,065,579 B2* | 6/2006 | Traversat et al. | 709/230 |
| 7,136,927 B2* | 11/2006 | Traversat et al. | 709/230 |
| 7,159,022 B2* | 1/2007 | Primm et al. | 709/224 |
| 7,165,107 B2* | 1/2007 | Pouyoul et al. | 709/225 |
| 7,167,920 B2* | 1/2007 | Traversat et al. | 709/230 |
| 7,206,841 B2* | 4/2007 | Traversat et al. | 709/225 |
| 7,340,500 B2* | 3/2008 | Traversat et al. | 709/201 |
| 7,376,724 B2* | 5/2008 | Goyal et al. | 709/223 |
| 7,395,327 B2* | 7/2008 | Bae et al. | 709/223 |
| 7,401,152 B2* | 7/2008 | Traversat et al. | 709/224 |
| 7,401,153 B2* | 7/2008 | Traversat et al. | 709/230 |
| 7,460,508 B2* | 12/2008 | Dssouli et al. | 370/338 |
| 7,484,225 B2* | 1/2009 | Hugly et al. | 719/330 |
| 7,487,509 B2* | 2/2009 | Hugly et al. | 719/310 |
| 7,529,838 B2* | 5/2009 | Primm et al. | 709/226 |
| 7,533,161 B2* | 5/2009 | Hugly et al. | 709/220 |
| 7,533,172 B2* | 5/2009 | Traversat et al. | 709/225 |
| 7,543,022 B2* | 6/2009 | Kubsch et al. | 709/204 |
| 7,574,523 B2* | 8/2009 | Traversat et al. | 709/238 |
| 7,953,837 B2* | 5/2011 | Bae et al. | 709/223 |
| 7,984,173 B2* | 7/2011 | Ban | 709/230 |
| 8,094,585 B2* | 1/2012 | Liang et al. | 370/256 |
| 8,122,108 B2* | 2/2012 | Revanuru et al. | 709/220 |
| 8,160,077 B2* | 4/2012 | Traversat et al. | 370/400 |
| 8,176,189 B2* | 5/2012 | Traversat et al. | 709/230 |
| 8,194,659 B2* | 6/2012 | Ban | 370/389 |
| 8,230,086 B2* | 7/2012 | Miller et al. | 709/229 |
| 8,312,084 B2* | 11/2012 | Blagojevic et al. | 709/205 |
| 8,335,762 B2* | 12/2012 | Gbadegesin et al. | 707/628 |
| 8,359,397 B2* | 1/2013 | Traversat et al. | 709/230 |
| 8,505,028 B2* | 8/2013 | Ban | 719/313 |
| 8,583,803 B2* | 11/2013 | Bhayani | 709/227 |
| 8,611,378 B2* | 12/2013 | Ban et al. | 370/535 |
| 8,667,340 B2* | 3/2014 | Stepanenko et al. | 714/57 |
| 2002/0073153 A1* | 6/2002 | Miller | 709/205 |
| 2002/0078263 A1* | 6/2002 | Darling et al. | 709/331 |
| 2002/0124081 A1* | 9/2002 | Primm et al. | 709/224 |
| 2002/0143855 A1* | 10/2002 | Traversat et al. | 709/202 |
| 2002/0143944 A1* | 10/2002 | Traversat et al. | 709/225 |
| 2002/0147771 A1* | 10/2002 | Traversat et al. | 709/203 |
| 2002/0147810 A1* | 10/2002 | Traversat et al. | 709/224 |
| 2002/0152299 A1* | 10/2002 | Traversat et al. | 709/223 |
| 2002/0156893 A1* | 10/2002 | Pouyoul et al. | 709/225 |
| 2002/0184310 A1* | 12/2002 | Traversat et al. | 709/204 |
| 2002/0184311 A1* | 12/2002 | Traversat et al. | 709/204 |
| 2002/0184357 A1* | 12/2002 | Traversat et al. | 709/223 |
| 2002/0184358 A1* | 12/2002 | Traversat et al. | 709/223 |
| 2002/0188657 A1* | 12/2002 | Traversat et al. | 709/201 |
| 2003/0002521 A1* | 1/2003 | Traversat et al. | 370/465 |
| 2003/0005102 A1* | 1/2003 | Russell | 709/223 |
| 2003/0041138 A1* | 2/2003 | Kampe et al. | 709/223 |
| 2003/0055892 A1* | 3/2003 | Huitema et al. | 709/204 |
| 2003/0125032 A1* | 7/2003 | Collins | 455/450 |
| 2003/0125059 A1* | 7/2003 | Collins | 455/509 |
| 2003/0125084 A1* | 7/2003 | Collins | 455/560 |
| 2003/0125085 A1* | 7/2003 | Collins | 455/560 |
| 2004/0030743 A1* | 2/2004 | Hugly et al. | 709/203 |
| 2004/0030794 A1* | 2/2004 | Hugly et al. | 709/230 |
| 2004/0031038 A1* | 2/2004 | Hugly et al. | 719/315 |
| 2004/0123183 A1* | 6/2004 | Tripathi et al. | 714/31 |
| 2004/0253956 A1* | 12/2004 | Collins | 455/445 |
| 2005/0160143 A1* | 7/2005 | Bae et al. | 709/205 |
| 2006/0059287 A1* | 3/2006 | Rivard et al. | 710/300 |
| 2006/0168178 A1* | 7/2006 | Hwang et al. | 709/223 |
| 2007/0097885 A1* | 5/2007 | Traversat et al. | 370/254 |
| 2007/0220141 A1* | 9/2007 | Primm et al. | 709/224 |
| 2008/0104218 A1* | 5/2008 | Liang et al. | 709/223 |
| 2008/0298357 A1* | 12/2008 | Ban | 370/389 |
| 2008/0298363 A1* | 12/2008 | Ban et al. | 370/390 |
| 2008/0298364 A1* | 12/2008 | Blagojevic et al. | 370/390 |
| 2008/0298395 A1* | 12/2008 | Ban | 370/474 |
| 2008/0301244 A1* | 12/2008 | Ban | 709/206 |
| 2008/0301706 A1* | 12/2008 | Ban | 719/313 |
| 2008/0307095 A1* | 12/2008 | Bae et al. | 709/226 |
| 2008/0313330 A1* | 12/2008 | Miller et al. | 709/225 |
| 2009/0219945 A1* | 9/2009 | Blagojevic et al. | 370/432 |
| 2010/0088300 A1* | 4/2010 | Gbadegesin et al. | 707/705 |
| 2012/0191860 A1* | 7/2012 | Traversat et al. | 709/226 |
| 2012/0254675 A1* | 10/2012 | Stepanenko et al. | 714/57 |
| 2013/0066476 A1* | 3/2013 | Tyagi et al. | 700/291 |
| 2013/0111069 A1* | 5/2013 | Gbadegesin et al. | 709/248 |
| 2013/0117449 A1* | 5/2013 | Hares et al. | 709/225 |
| 2014/0019605 A1* | 1/2014 | Boberg et al. | 709/223 |
| 2014/0105220 A1* | 4/2014 | Ban et al. | 370/413 |

OTHER PUBLICATIONS

Bonjour—Frequently Asked Questions [online]. [retrieved Mar. 30, 2011]. Retrieved from the Internet: http://developer.apple.com/networking/bonjour/faq.html, 3 pages.

Wobus, John, DHCP FAQ [online], Oct. 27. 1009 [retrieved Mar. 30, 2011]. Retrieved from the Internet: http://www.dhcp-handbook.com/dhcp_faq.html, 22 pages.

DNS Service Discovery (DNS-SD) [online] [retrieved Mar. 30, 2011]. Retrieved from the Internet: http://www.dns-sd.org/. 4 pages.

Domain Name System—Wikipedia, the free encyclopedia [online]. [retrieved from the Internet: http://en.wikipedia.org/wiki/Domain_Name_System, 15 pages.

* cited by examiner

GROUP MEMBERSHIP DISCOVERY SERVICE

BACKGROUND

This specification relates to network communication.

Service discovery protocols allow applications running on interconnected devices to find one another and other resources on a network, such as peer devices, printers, or processes. Clients can typically communicate intermittently with a particular server to poll for updated information about available network resources.

SUMMARY

This specification describes technologies relating to service discovery protocols.

In general, one innovative aspect of the subject matter described in this specification can be embodied in methods that include the actions of receiving a plurality of different join requests from a plurality of clients, each join request indicating a respective group and value pair wherein the value is requested to join the group; updating a respective count for each received pair, the count indicating a count of a join events received by servers for the pair, wherein a join event occurs when a join request is received from a client or when a notification of a join request on a different server is received; sending a notification to one or more other clients that have requested such notification, wherein the notification includes a first group and value pair having a respective count that was updated for a first time; and receiving a notification from a server in a plurality of servers regarding a different second group and value pair received by the server and updating a respective count for the second group and value pair. Other embodiments of this aspect include corresponding systems, apparatus, and computer programs, configured to perform the actions of the methods, encoded on computer storage devices.

These and other embodiments can each optionally include one or more of the following features. Each client in the plurality of clients sends a join request in the join requests to at least two servers in the plurality of servers. The actions further include determining that the server has failed; and responsive to the determining, updating the respective count for the second group and value pair to indicate that there is one less server. The actions further include receiving a leave event from the server for the second group and value pair, wherein the leave event indicates that the second value is no longer in the second group; and updating the respective count for the second group and value pair to indicate that there is one less server. The actions further include determining that the respective count for the second group and value pair is zero; and responsive to the determining, sending a leave event to one of the other clients that has requested such notification. The actions further include determining that the respective count for the second group and value pair is no longer zero; and responsive to the determining, sending a join event to one of the other clients that has requested such notification. The actions further include upon receiving a request for notification of a particular group from a client, providing all known values for the group to the client; and subsequently providing to the client changes in group membership, wherein the changes in group membership comprise join and leave events. Each group is identified by a unique name. A request for notification of new groups on a metadata group is sent to all other servers. The actions further include receiving from a notifying server a notification of a new value in the metadata group comprising a group name; and initiating a local watch command to the notifying server including the new value, wherein the local watch command is a request for notification of join and leave events from clients directly connected to the notifying server, wherein a leave event indicates that a value is no longer in a group.

Particular embodiments of the subject matter described in this specification can be implemented so as to realize one or more of the following advantages. A discovery service protocol implementing group membership through a mesh network of servers can provide increased throughput compared to conventional methods. A system implementing the group membership discovery service can be made robust to handle server failures, and the system can scale to a number of devices many orders of magnitude larger than conventional discovery protocols. The low latency of a discovery service protocol with group membership can also better handle high rates of network churn due to servers restarting and migrating to other devices, as well as frequent reassignment of ports.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Many conventional network discovery problems can be solved when modeled by a discovery service implementing a group membership protocol. Clients can join a particular group with a "Join" command, and clients can request current group membership data with a "Watch" command. Both joins and watches for a particular group can be serviced by a mesh network of interconnected servers. The joins and watches of a group membership discovery service can be used by clients to provide and receive information about any kind of resource on a network, e.g., devices, processes, data, transactions, or any other kind of resource. The term "client" is used herein to describe devices or processes issuing Join and Watch commands to servers. Clients issuing such commands can also be servers themselves, either according to the discovery service or otherwise. For example, clients of the discovery service can be proxy servers trying to locate backend servers. Furthermore, a "server" can also simultaneously be a client, for example, by issuing a Join command. In addition, clients and servers can be executing on the same device or in the same process.

Figure 1:
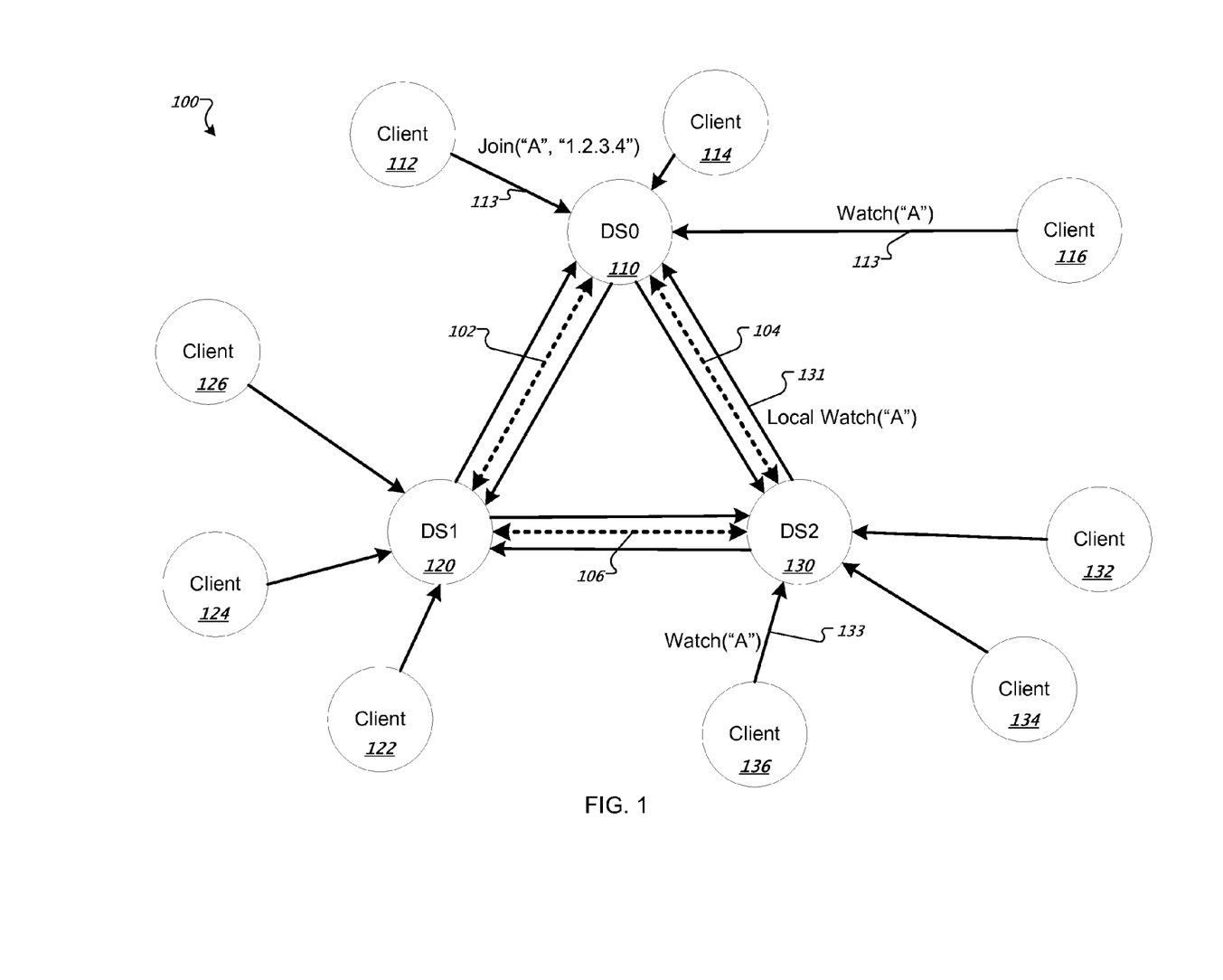
FIG. 1 is a diagram of an example network that implements a discovery service.

FIG. 1 is a diagram of an example network 100 that implements a discovery service. The network 100 as shown in FIG. 1 includes a number of servers and clients, which can either be implemented as separate processes executing on a single device (e.g., a data processing apparatus) or multiple processes running on separate devices. Both servers and clients can issue Join and Watch commands to other servers in the network 100. Clients can issue Join and Watch commands on a particular group identified for a particular task, which can be locating resources on the network 100 (e.g. peer devices). Servers can issue Join and Watch commands to propagate group membership information to and from each other and to and from participating clients.

In some implementations, Join and Watch commands are implemented as remote procedure calls ("RPCs") on other devices in the network. The Join and Watch commands can both require ongoing communication with other servers or clients in the network. When communication ceases, for example, due to a device failure, both servers and clients can react to and recover from the failure. In some implementations, a server or client considers communication to have failed if no communication has occurred within a threshold time period. In some implementations, a communication failure is an interrupted RPC. Other communication protocols are possible.

In general, Join commands can take as arguments a group name and a value. The group name can be a unique group identifier. The value can be any kind of data, e.g., a string of characters or a string of bits. Watch commands can take as an argument a group name. Servers can respond to Watch commands with Join and Leave events. Join and Leave events can both contain a value associated with the Join or Leave event. Join events, for example, contain a value newly added to a group. Clients and servers can both receive Join events by issuing Watch commands to other servers. To a server, a Join command received directly from a client is also treated as a Join event. Leave events, for example, contain a value that is newly discovered to be absent from the group. Clients and servers can both receive Leave events by issuing Watch commands to other servers. To a server, an interrupted Join command from a client and an interrupted Watch command to another server can both be treated as Leave events. The value for a Leave event due to an interrupted Join command can be the value previously provided by the Join command. The values for a Leave event due to an interrupted Watch command to another server can be all values previously received as Join events from that particular server. However, as will be described below, Leave events received by servers need not be automatically propagated to clients, particularly when other servers in the network contain group membership information for values in received Leave events.

Watch commands can be either global or local. A regular (global) Watch command can be a request for global group membership information, i.e. a set of all values in a particular group. However, in some implementations, a group membership discovery service does not guarantee that all clients receive consistent group membership information in response to Watch commands. In other words, two clients in the network issuing global Watch commands can receive different group membership information at the same time. This can happen, for example, when a previously interconnected network becomes partitioned due to server failures. Therefore, in some implementations where consistency is not guaranteed, a client's received response to a global Watch command can contain only global group membership information that the responding server has received thus far. In this scenario, other clients communicating with other servers in the network need not receive identical group membership information.

Unlike a global Watch command, the response to a Local Watch command can contain only Join and Leave events caused by clients directly communicating with the responding server, as opposed to global group membership information that the responding server has received.

In some implementations, a server initially responds to a Watch command with full group membership data for the particular group, and thereafter, the server provides updates that contain only subsequent Join and Leave events. For example, a client can join a group named "ActiveClients" with its current IP address (e.g. "1.2.3.4") as the value by issuing the command Join("ActiveClients", "1.2.3.4"). Other clients on the network 100 that want to discover the IP addresses of clients in the group "ActiveClients" can issue the command Watch("ActiveClients"). Servers in the network 100 can initially respond to the Watch("ActiveClients") command by returning a list of all values (i.e., IP addresses in this case) that have joined the group "ActiveClients," which can include "1.2.3.4." If another client subsequently joins the group "ActiveClients" with IP address "2.3.4.5", a server can respond to existing Watch commands with only a Join event containing "2.3.4.5", rather than a list of all values in the group (e.g., including "1.2.3.4"). If the client with IP address "1.2.3.4" disconnects from a server, the server can respond to existing Watch commands with only a Leave event containing "1.2.3.4".

The network 100 includes a number of servers DS0 110, DS1 120, and DS2 130. In some implementations, the servers are connected as a mesh network in which servers can propagate data through the network 100 from other servers, in addition to sending and receiving data from clients. The servers 110, 120, and 130 can communicate with one another using a metadata protocol (indicated by dashed line connections 102, 104, and 106) to determine which other servers have received Joins for a particular group. In some implementations, the metadata protocol is a set of Joins and Watches on a special metadata group name. The metadata protocol can, however, be implemented as any kind of networking protocol, and can be a hidden implementation detail to users of the discovery service. The metadata protocol will be described further below with respect to FIG. 2.

Each server can be connected to a number of clients by either Joins or Watches. For example, the server DS0 110 is connected to the clients 112, 114, and 116. The server DS1 is connected to the clients 122, 124, and 126. The server DS2 is connected to the clients 132, 134, and 136. When a client joins a group, group membership information can be updated by propagating the join information to other servers in the network. For example, if the client 112 issues a command 113 that is Join("A", "1.2.3.4") to the server DS0 110, the server DS0 110 can update its membership information for group "A" to include the value "1.2.3.4".

The client 116 can issue a Watch("A") command 113 to the server DS0 110. The server DS0 110 can respond to the client 116 with the set of values for the group "A", which can include the value provided by the client 112, i.e. "1.2.3.4." The Watch command issued by the client 116 can occur either before or after the client 112 issues the Join command 113. The server DS0 110 can continue responding to the Watch ("A") command 113 as new values are added to (with Join events) or removed from (with Leave events) group "A".

Other servers on the network 100, using the metadata protocol (e.g. 104), can detect that the server DS0 110 has newly updated group membership information for group "A", and can in response request membership information for group "A". To request the updated group membership information, a server can issue a Local Watch command. For example, after using the metadata protocol to discover that the server DS0 110 has updated group membership information, the server DS2 can issue a command 131, which is a Local Watch for the group "A". In response to the Local Watch, the server DS0 110 can respond to the server DS2 130 with a Join event including group membership information for group "A" for clients directly communicating with it, which can include "1.2.3.4.", the value previously provided by the client 112.

In some implementations, servers only issue Local Watches to other servers when they have directly received at least one client Watch command. For example, the client 136 has issued Watch("A") command 133 to the server DS2 130. In some implementations, the server DS2 130 would not issue a Local Watch command to the server DS0 110 if the client 136 had not issued the Watch command 133. Servers can propagate information through the network 100 using Local Watches, and clients can discover group membership information using normal (global) Watches.

After the server DS2 130 receives a response to Local Watch command 131, the server DS2 130 can respond to the Watch command 133 from the client 136, which can include values for group "A" that the server DS2 130 received from the server DS0 110, which can include "1.2.3.4", the value previously provided by the client 112. The described mechanism is an example illustration of the client 136 discovering information about the client 112 through the group membership discovery service.

Figure 2:
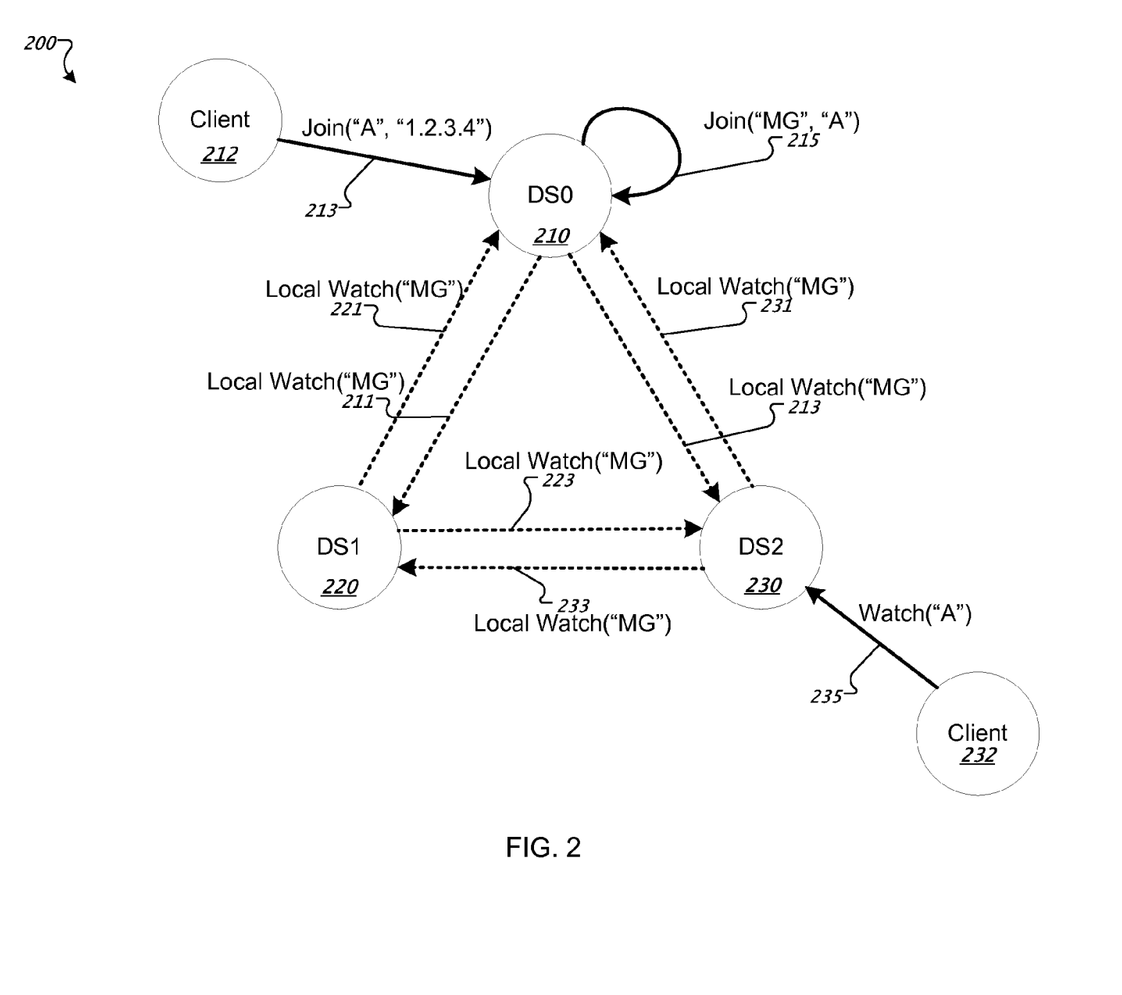
FIG. 2 is a diagram of servers implementing an example metadata protocol.

FIG. 2 is a diagram of servers implementing an example metadata protocol. Servers in the network 200 can use a metadata protocol to determine when other servers have updated group membership information. Using a metadata protocol can improve performance by reducing the number of servers issuing Local Watch commands for a particular group. The metadata protocol illustrated in FIG. 2 is implemented by servers joining and watching a special metadata group name, "MG". Servers can issue Join commands on the metadata group "MG" with values that are the group names of new groups identified by client Join commands.

In some implementations, the metadata protocol is implemented by each server issuing a Local Watch command on the metadata group to every discovery service server in the network 200. For example, the server DS0 210 issues Local Watch("MG") to the server DS1 220 with command 211 and to the server DS2 230 with command 213. The server DS1 220 issues Local Watch("MG") to the server DS0 210 with command 221 and to the server DS2 230 with command 223. The server DS2 230 issues Local Watch("MG") to the server DS0 210 with command 231 and to the server DS1 220 with command 233.

When a client issues a Join command to a server with a new group name, the server issues a Join command on the metadata group. For example, when the client 212 issues Join("A", "1.2.3.4") to the server DS0 210, the server DS0 210 determines that "A" is a new group. In response to determining that "A" is a new group, the server DS0 210 issues a command 215 on the metadata group, in which the value of the Join is the name of the new group, Join("MG", "A").

The server DS0 210 receives its own join command 215 on the metadata group "MG" and responds to all Local Watches on the group "MG" with the name of the new group, "A". Upon receiving the name of the new group, other servers can request group membership information from the providing server with a Local Watch, e.g., Local Watch("A"), as described in FIG. 1. In some implementations, a server will not issue a Local Watch on the new group unless a client device has issued a Watch on that group. For example, after receiving the name of the new group from the server DS0 210, the server DS2 230 can issue a Local Watch("A") (not shown) to the server DS0 210 and receive in response the group membership information for group "A", which can include the value "1.2.3.4" provided by client 212. The server DS2 230 can then respond to the command 235 Watch("A") by client 232 with the newly-obtained value "1.2.3.4".

In contrast, upon receiving the name of the new group from the server DS0 210, the server DS1 220 can refrain from issuing a Local Watch command to the server DS0 210 on the new group. In some implementations, refraining from issuing Local Watches when no client devices have issued a normal Watch can save network bandwidth and server resources.

Figure 3:
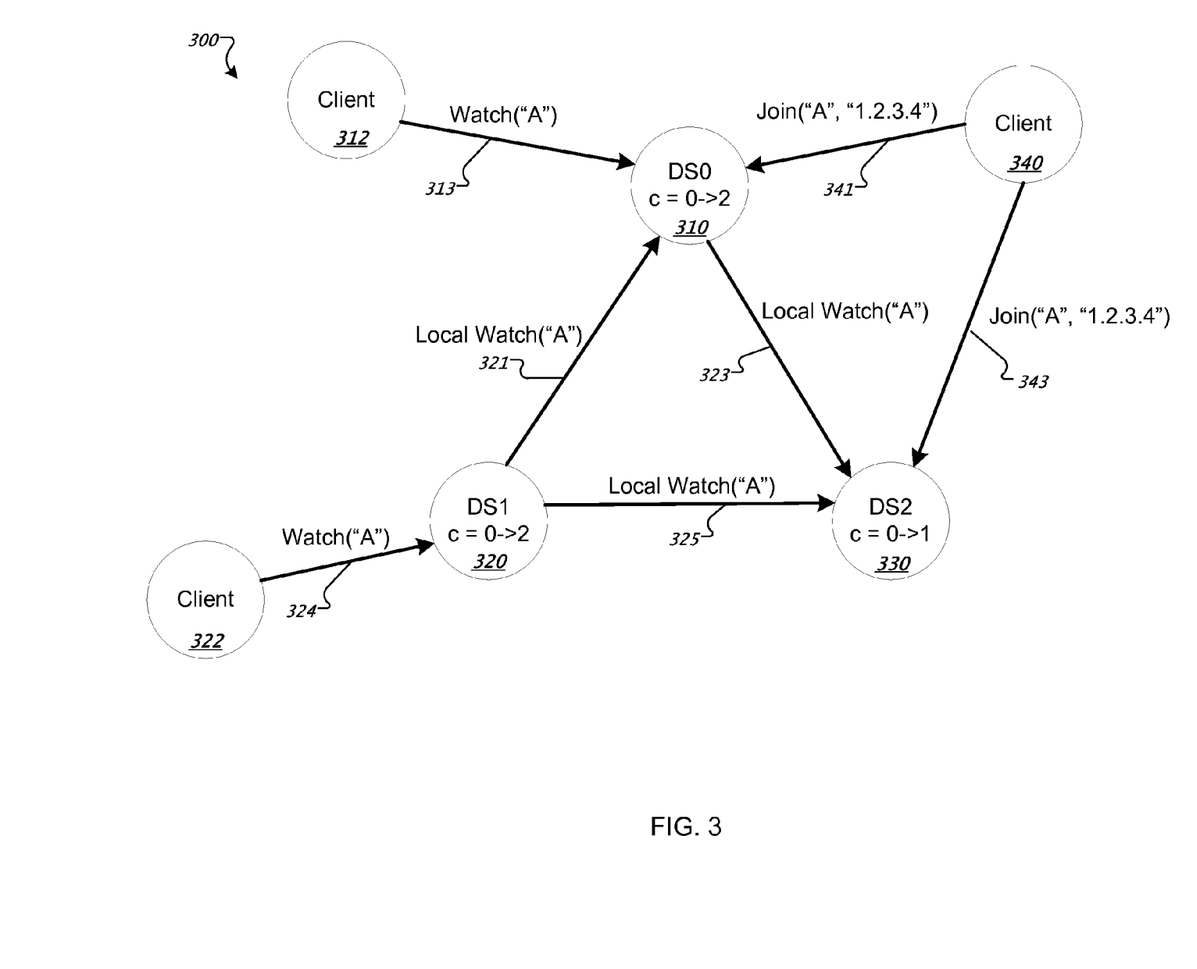
FIG. 3 is a diagram of an example network with servers implementing a discovery service.

FIG. 3 is a diagram of an example network 300 with servers implementing a discovery service. The servers as shown in FIG. 3 implement reference counting to improve network robustness and reliability.

In this example, both client 312 and client 322 issue Watch commands to servers in order to find resources in the network 300, e.g. client 340. The clients 312 and 322 can be, for example, front end servers of a website routing incoming network traffic, and client 340 can be a backend server for handling the incoming network traffic.

The clients 312 and 322 issue Watch commands 313 and 323 on group "A" to nearby servers DS0 310 and DS1 320, respectively, in order to receive information about other clients in group "A". The servers DS0 310 and DS1 320, communicating with the metadata protocol, have not received any data for group "A" yet, so the servers do not respond to the Watch commands yet.

Client 340 issues a Join command on group "A" 341 and 343 to each of two different servers: server DS0 310 and server DS2 330. In some implementations, clients joining a group can issue Join commands to two or more servers to increase robustness of the network 300 in the face of device and process failures. The Join commands to each of the servers DS0 310 and DS2 330 are treated as Join events by the two servers. The servers DS0 310 and DS2 330 both increment a reference count of Join events for the group and value pair as a result of receiving the Join command from the client 340. The reference count of Join events for ["A", "1.2.3.4"] increases from 0 to 1 on both of the servers DS0 310 and DS2 330. The reference count of Join events for a particular [group, value] pair can be increased by received Join events for the pair, which can include a Join command received from a client or a Join event received from another server on the network 300. The reference count of Join events for the pair can be decreased by received Leave events for the pair, which can include interrupted Join commands from clients, Leave events received from another server on the network 300, and interrupted Local Watches issued to other servers on the network 300.

Using the metadata protocol, one or both of the servers DS0 310 and DS2 330 announce the presence of a new group "A" to all other servers in the network 300 (e.g. DS1 320). After learning of the new group "A", the server DS0 310 also determines that a client 312 has a currently pending Watch command 313. In response, the server DS0 310 issues a Local Watch("A") command 323 to servers that announced the presence of a new group, e.g. the server DS2 330. In response to the Local Watch("A") command 323, the server DS2 330 responds with a Join event including its group membership information for group "A", which includes the value "1.2.3.4." The server DS0 310 increments its reference count of Join events for the group and value pair ["A", "1.2.3.4"] from 1 to 2. Because no clients have issued a Watch command to the server DS2 330, the server DS2 330 does not issue a Local Watch to the server DS0 310. As a result, the reference count for Join events for ["A", "1.2.3.4"] on the server DS2 330 remains at 1.

Using the metadata protocol, the server DS1 320 discovers that both servers DS0 310 and DS2 330 have received new group information for group "A". In response, the server DS1 320 issues Local Watch("A") commands 321 and 325 to the servers DS0 310 and DS2 330 respectively. In response, the server DS1 receives Join events from both that include the group value pair ["A", "1.2.3.4."] and increments its reference count of Join events for this group value pair accordingly, from 0 to 1 to 2.

In some implementations, a server responds to client-issued Watch commands with Join events when its reference count for Join events including a particular [group, value] pair transitions from 0 to nonzero. In this example, the server DS0 310 determines that its Join event count for the ["A", "1.2.3.4"] pair has increased from 0 to 2. In response, DS0 310 reports a Join event in response to the Watch("A") command 313, which includes the group membership information for group "A", e.g., the value "1.2.3.4" provided by client 340. Likewise, the server DS1 320 determines that its Join event count for ["A", "1.2.3.4"] has increased from 0 to nonzero, and responds to the Watch("A") command 324 with a Join event including new group membership information for group "A", including the value "1.2.3.4."

In some implementations, a server responds to client-issued Watch commands with Leave events when a reference count of Join events for a particular [group, value] pair decreases from nonzero to 0. For example, if the Join command 341 from client 340 fails or is interrupted, the server DS0 310 can decrement its count of Join events for the ["A", "1.2.3.4"] pair from 2 to 1. When a Join command from a client fails, the server can issue a Leave event to every inbound Local Watch from other servers. Therefore, the server DS0 310 can issue a Leave event to the server DS1 320 for Local Watch command 321. In response to the received Leave event, the server DS1 320 can decrement its reference count of Join events for the ["A", "1.2.3.4"] pair from 2 to 1. However, neither server DS0 310 nor server DS1 320 issue Leave events to their clients 312 and 322 because their reference counts remain above 0.

When the server DS2 330 also notices that the Join command 343 from client 340 has failed, it can decrement its reference count of Join events from 1 to 0 and respond to all inbound Local Watches on the group with a Leave event. For example, the server DS2 330 can issue Leave events for inbound Local Watch 323 from the server DS0 310 and inbound Local Watch 325 from the server DS1 320. After receiving the Leave events from the server DS2 330, both servers DS0 310 and DS1 320 can decrement their reference counts from 1 to 0. As a result, the server DS0 310 can issue a Leave event for the client-issued Watch command 313 to client 312, and the server DS1 320 can issue a Leave event for the client-issued Watch command 324 to client 322.

Figure 4:
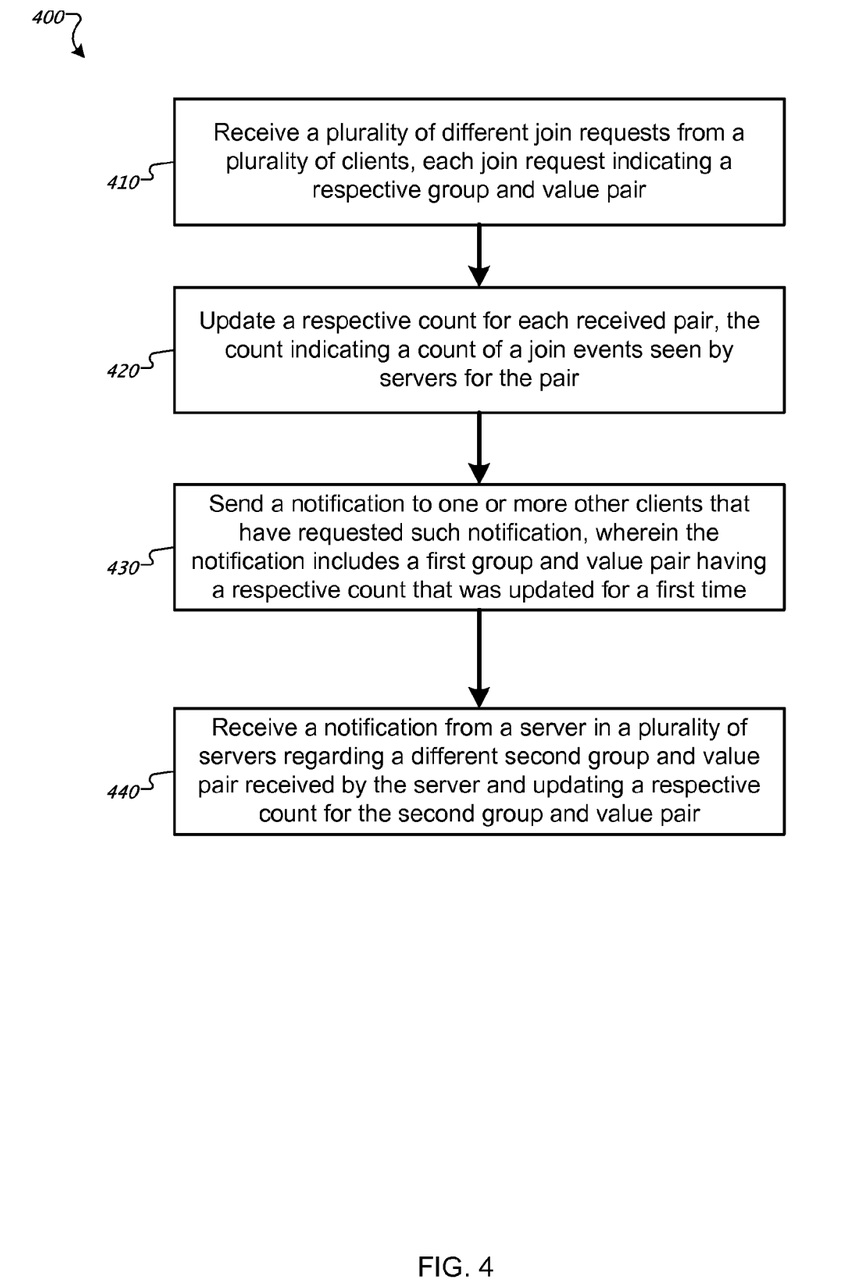
FIG. 4 is a flow chart of an example server process that implements a discovery service with reference counting.

FIG. 4 is a flow chart of an example process 400 that implements a discovery service with reference counting. The process 400 will be described as being performed by a server (e.g., data processing apparatus) that executes software to implement a group membership discovery service.

The server (e.g., server DS0 110) receives a plurality of different Join requests from a plurality of clients (e.g., clients 112 and 114), each Join request indicating a respective group and value pair (410).

The server updates a respective count for each received pair, the count indicating a count of a number of different servers that have received the pair (420). Join events received by servers can include a join request received from a client or a Join event received from another server on the network, indicating Join request from a client to a different server on the network.

The server sends a notification to one or more other clients that have requested such notification, wherein the notification includes a first group and value pair having a respective count that was updated for a first time (430). In some implementations, the server can respond to Watch commands from connected clients with a Join event when the Join event reference count for a [group, value] pair goes from 0 to 1. The server will not issue Join events to clients when the reference count increases to 2 or higher. The server can also issue Leave events when the Join event reference count for a [group, value] pair goes from 1 to 0.

The server receives a notification from a server in a plurality of servers regarding a different second group and value pair received by the server and updating a respective count for the second group and value pair (440). In some implementations, the server maintains a reference count for each active [group, value] pair in the network.

Figure 5:
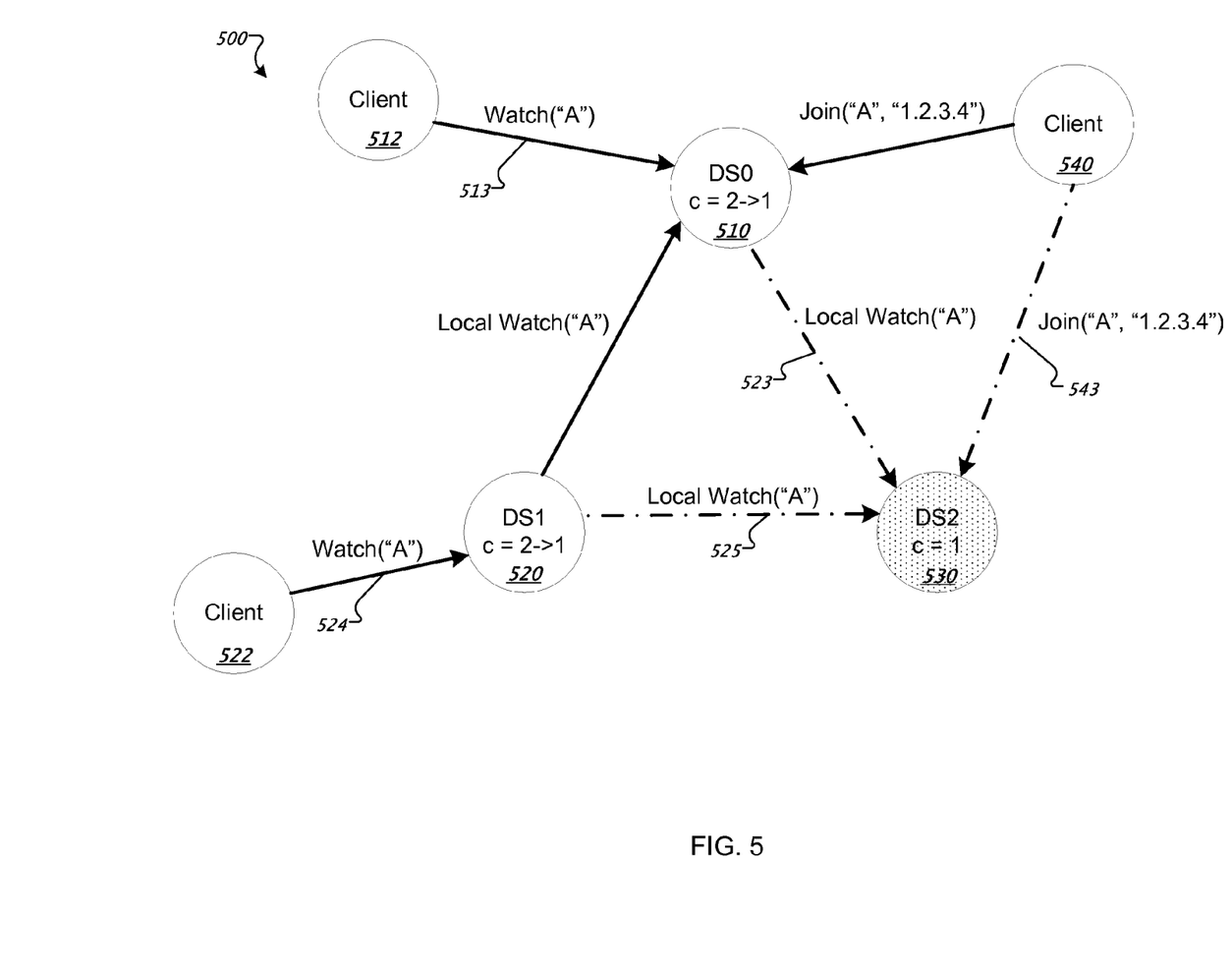
FIG. 5 is a diagram of an example network with servers implementing a discovery service with a failed server.

FIG. 5 is a diagram of an example network 500 with servers implementing a discovery service with a failed server. The network 500 as shown in FIG. 5 will be described as having a server failure after reaching the state as shown in FIG. 3. The server DS2 530 has now failed, eliminating connections to all other devices. Client 512 has issued Watch command 513 to server DS0 510, and client 522 has issued Watch command 524 to server DS1 520.

After failure of server DS2 530, the Join command 543 terminates. Local Watches 523 and 525 also terminate. The termination of Local Watch 523 is treated by the server DS0 510 as a Leave event for the [group, value] pair. In response, the server DS0 510 decrements its reference count from 2 to 1. Likewise, the termination of Local Watch 525 results in the server DS1 520 decrementing its reference count for the pair from 2 to 1. Because the reference counts of servers DS0 510 and DS1 520 remain above zero, the clients 512 and 522 do not experience a Leave event for the ["A", "1.2.3.4"] pair even after failure of the server DS2 530.

Figure 6:
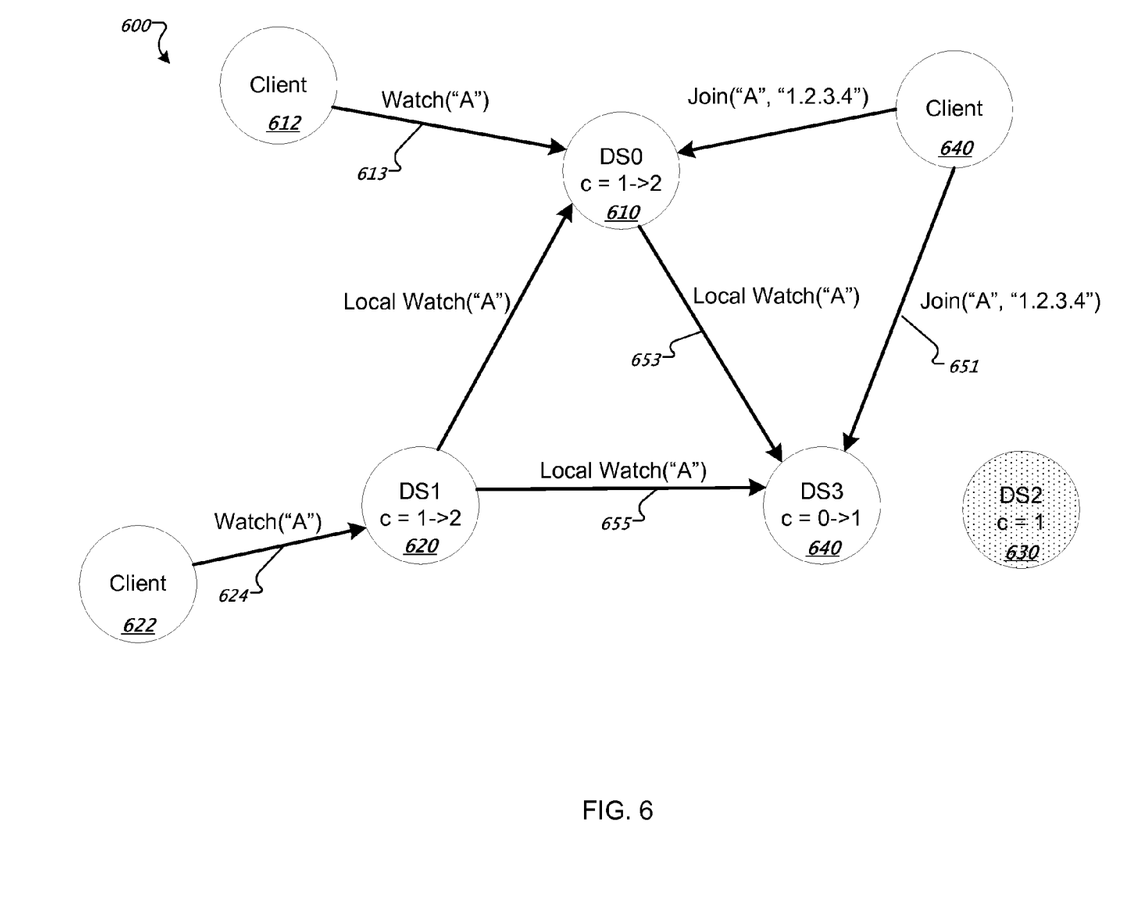
FIG. 6 is a diagram of another example network with servers implementing a discovery service network with a failed server.

FIG. 6 is a diagram of another example network 600 with servers implementing a discovery service with a failed server. The network 600 as shown in FIG. 6 will be described as a new server coming online to replace the failed server after reaching the state as shown in FIG. 5.

New server DS3 640 comes online to replace failed server DS2 630. The client 640 reestablishes a connection to a second server with Join command 651. In response to the Join command 651, the server DS3 640 increments its reference count for the ["A", "1.2.3.4"] pair from 0 to 1. Using the metadata protocol, servers DS0 610 and DS1 620 detect that server DS3 640 has new group membership information for group "A", and in response, both issue Local Watch commands 653 and 655 to the server DS3 640.

In response to the Local Watch commands, the server DS3 640 returns Join events for the ["A", "1.2.3.4"] pair to both servers DS0 610 and DS3 640. Both servers DS0 610 and DS1 620 increment their reference count of Join events for the pair from 1 to 2. Because the reference count remained above 0, clients 612 and 622 do not receive Join events from servers DS0 610 and DS1 620. The failure of the server DS2 630 and the replacement by the server DS3 640 has been entirely transparent to clients 612 and 622 as a result of the reference counting of Join events maintained by the servers in the network 600. In other words, Leave events need not be provided in response to Watch commands 613 and 624.

Figure 7:
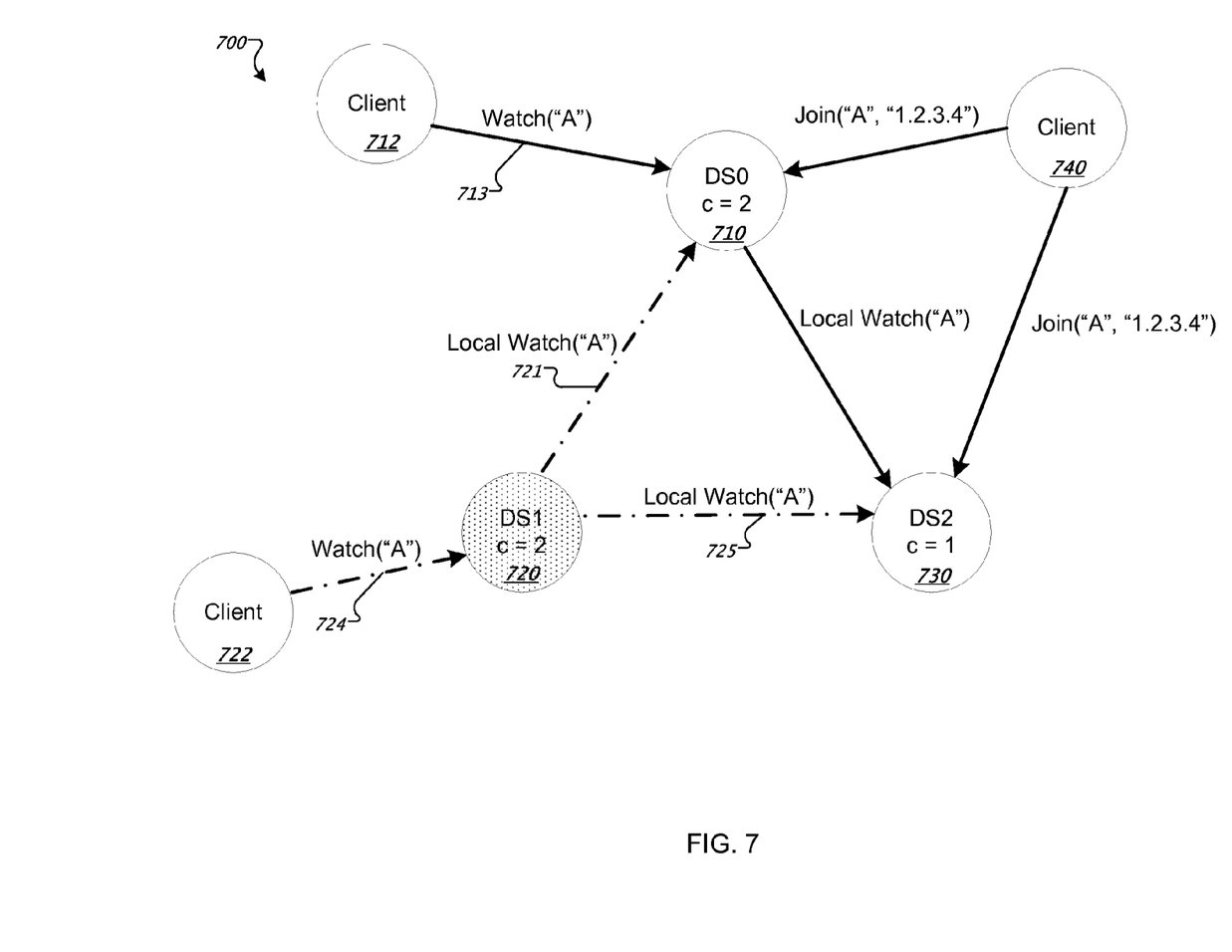
FIG. 7 is a diagram of another example network with servers implementing a discovery service network with a failed server.

FIG. 7 is a diagram of another example network 700 with servers implementing a discovery service with a failed server. The network 700 as shown in FIG. 7 will be described as having a server failure after reaching the state as shown in FIG. 3. The server DS1 720 has now failed, eliminating connections to all other devices. Client 712 had previously issued Watch command 713 to server DS0 710, and client 722 had previously issued Watch command 724 to server DS1 720. After failure of server DS1 720, the Watch command 724 terminates. The Local Watch 721 to the server DS0 710 terminates, and the Local Watch 725 to the server DS2 730 also terminates.

The client 722 is temporarily disconnected from the network 700. In some implementations, the complete disconnection is hidden from any calling processes while the client 722 attempts to connect to another server.

The reference counts for servers DS0 710 and DS2 730 can remain unchanged. The terminated Local Watches 721 and 725 need not result in Leave events for servers DS0 710 and DS2 730. In some implementations, only failed Local Watches to another server result in Leave events.

Once failed server DS1 720 is restarted or replaced by a different server, client 722 can reconnect with a Watch command. As described in FIG. 3, the server DS1 720 can detect that servers DS0 710 and DS2 730 have data for group "A" and can issue Local Watches to each server, which will result in its Join event reference count incrementing from 0 to 1 to 2. The restarted server DS1 720 can determine that its reference count has increased from zero to nonzero and can respond to the Watch("A") command 724 with a Join event for the ["A", "1.2.3.4"] pair.

In some implementations, upon receiving the Join event, the client 722 can compare its previous state to the current group membership state. If the state has not changed, the client 722 need not report Join or Leave events to the calling process. Therefore, the failure of server DS1 720 can remain hidden to any calling processes running on client 722.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by a plurality of discovery servers, wherein each discovery server performs operations comprising:
    maintaining by the discovery server a respective group name/value count for each of a plurality of group name/value pairs, each group name/value count being a count for a distinct name-value pair of a user-specified group name and value pair;
    receiving a Watch command on a first user-specified group name from a first client device, wherein the Watch command comprises a request to receive Join events for newly added values in the first user-specified group;
    receiving a first Join event from another discovery server, the first Join event including the first user-specified group name and a first value, wherein a Join event received from a particular discovery server comprises a notification of a Join command or a Join event being received by the particular discovery server;
    incrementing the group name/value count for the first group name and the first value in response to receiving the first Join event;
    determining that the group name/value count for the first group name and the first value transitioned from zero to nonzero in response to the discovery server incrementing the group name/value count for the first group name and the first value; and
    in response to determining that the group name/value count for the first group name and the first value transitioned from zero to nonzero in response to the discovery server incrementing the group name/value count for the first group name and the first value, sending a second Join event to the first client in response to the Watch command received from the first client on the first user-specified group name, the second Join event having the first value of the first Join event.

2. The method of claim 1, wherein the operations further comprise:
    receiving an initial notification of the first group name from a first discovery server;
    issuing a Local Watch command on the first group name to the first discovery server, wherein the Local Watch command on the first group name is a request to receive Join events for the first group name from the first discovery server in response to the first discovery server receiving Join events for the first group name;

receiving a third Join event from the first discovery server, the third Join event having the first group name and the first value; and incrementing the group name/value count for the first group name and the first value pair in response to receiving the third Join event from the first discovery server.

3. The method of claim 2, wherein the operations further comprise:

determining that the first discovery server has failed; and in response to determining that first discovery server has failed, decrementing the group name/value count for the first group name and the first value.

4. The method of claim 1, wherein the operations further comprise:

receiving a Leave event from a second client device, the Leave event having the first user-specified group name and the first value; and decrementing the group name/value count for the first user-specified group name and the first value in response to receiving the Leave event having the first user-specified group name and the first value.

5. The method of claim 4, wherein the operations further comprise:

determining that the group name/value count for the first user-specified group name and the first value is zero and that, before decrementing the group name/value count for the first user-specified group name and the first value in response to receiving the Leave event from the second client device, the group name/value count was nonzero;

determining that the Watch command on the first user-specified group name is pending; and sending a second Leave event having the first value to the first client device.

6. The method of claim 1, wherein the operations further comprise providing a notification of the first group name to another discovery server using a metadata protocol, the metadata protocol being distinct from user-specified Join events and user-specified Leave events on user-specified group names.

7. The method of claim 6, wherein providing the notification of the first group name to another discovery server using the metadata protocol comprises sending a metadata Join event to each other discovery server in the plurality of discovery servers, the metadata Join event having a reserved metadata group name and having a second value that includes the first group name.

8. The method of claim 7, wherein the operations further comprise:

receiving a Local Watch command on the metadata group name from a second discovery server, wherein a Local Watch command on the metadata group name is a request issued to a particular discovery server to receive metadata Join events for the metadata group name from the particular discovery server in response to the particular discovery server receiving metadata Join events for the metadata group name; and in response to receiving the Local Watch command on the metadata group name from the second discovery server, issuing a respective Local Watch command on the metadata group name to every other discovery server of the plurality of discovery servers.

9. The method of claim 7, wherein the operations further comprise:

determining that the first Join event includes a group name for a new user-specified group; and issuing a respective Local Watch command on the metadata group name to every other discovery server of the plurality of discovery servers, wherein a Local Watch command on the metadata group name is a request issued to a particular discovery server to receive metadata Join events for the metadata group name from the particular discovery server in response to the particular discovery server receiving metadata Join events for the metadata group name.

10. The method of claim 1, wherein the operations further comprise in response to receiving the Watch command from the first client device, sending, to the first client device, respective Join events having respective values of each non-zero group name/value count having the first group name.

11. A system comprising: a plurality of discovery servers and one or more hardware storage devices storing instructions that are operable, when executed by each of the plurality of discovery servers, to cause each discovery server to perform operations comprising:

maintaining, by the discovery server a respective group name/value count for each of a plurality of group name/value pairs, each group name/value count being a count for a distinct name-value pair of a user-specified group name and value pair;

receiving a Watch command on a first user-specified group name from a first client device, wherein the Watch command comprises a request to receive Join events for newly added values in the first user-specified group;

receiving first Join event from another discovery server, the first Join event including the first user-specified group name and a first value, wherein a Join event received from a particular discovery server comprises a notification of a Join command or a Join event being received by the particular discovery server;

incrementing the group name/value count for the first group name and the first value in response to receiving the first Join event;

determining that the group name/value count for the first group name and the first value transitioned from zero to nonzero in response to the discovery server incrementing the group name/value count for the first group name and the first value; and in response to determining that the group name/value count for the first group name and the first value transitioned from zero to nonzero in response to the discovery server incrementing the group name/value count for the first group name and the first value, sending second Join event to the first client in response to the Watch command received from the first client on the first user-specified group name, the second Join event having the first value of the first Join event.

12. The system of claim 11, wherein the operations further comprise:

receiving an initial notification of the first group name from a first discovery server;

issuing a Local Watch command on the first group name to the first discovery server, wherein the Local Watch command on the first group name is a request to receive Join events for the first group name from the first discovery server in response to the first discovery server receiving Join events for the first group name;

receiving a third Join event from the first discovery server having, the third Join event having the first group name and the first value; and incrementing the group name/value count for the first group name and the first value pair in response to receiving the third Join event from the first discovery server.

13. The system of claim 12, wherein the operations further comprise:
   determining that the first discovery server has failed; and
   in response to determining that the first discovery server has failed, decrementing the group name/value count for the first group name and the first value.

14. The system of claim 11, wherein the operations further comprise:
   receiving a Leave event from a second client device, the Leave event having the first user-specified group name and the first value; and
   decrementing the group name/value count for the first user-specified group name and the first value in response to receiving the Leave event having the first user-specified group name and the first value.

15. The system of claim 14, wherein the operations further comprise:
   determining that the group name/value count for the first user-specified group name and the first value is zero and that, before decrementing the group name/value count for the first user-specified group name and the first value in response to receiving the Leave event from the second client device, the group name/value count was nonzero;
   determining that the Watch command on the first user-specified group name is pending; and
   sending a second Leave event having the first value to the first client device.

16. The system of claim 11, wherein the operations further comprise providing a notification of the first group name to another discover server using a metadata protocol, the metadata protocol being distinct from user-specified Join events and user-specified Leave events on user-specified group names.

17. The system of claim 16, wherein providing the notification of the first group name to another discovery server using the metadata protocol comprises sending a metadata Join event to each other discovery server in the plurality of discovery servers, the metadata Join event having a reserved metadata group name and having a second value that includes the first group name.

18. The system of claim 17, wherein the operations further comprise:
   determining that the first Join event includes a group name for a new user-specified group; and
   issuing a respective Local Watch command on the metadata group name to every other discovery server of the plurality of discovery servers, wherein a Local Watch command on the metadata group name is a request issued to a particular discovery server to receive metadata Join events for the metadata group name from the particular discovery server in response to the particular discovery server receiving metadata Join events for the metadata group name.

19. The system of claim 11, wherein the operations further comprise in response to receiving the Watch command from the first client device, sending, to the first client device, respective Join events having respective values of each non-zero group name/value count having the first group name.

20. The system of claim 11, wherein the operations further comprise:
   receiving a Local Watch command on the metadata group name from a second discovery server, wherein a Local Watch command on the metadata group name is a request issued to a particular discovery server to receive metadata Join events for the metadata group name from the particular discovery server in response to the particular discovery server receiving metadata Join events for the metadata group name; and
   in response to receiving the Local Watch command on the metadata group name from the second discovery server, issuing a respective Local Watch command on the metadata group name to every other discovery server of the plurality of discovery servers.

21. A computer program product, encoded on one or more non-transitory computer storage media, comprising instructions that when executed by each discovery server of a plurality of discovery servers cause the discovery server to perform operations comprising:
   maintaining, by the discovery server a respective group name/value count for each of a plurality of group name/value pairs, each group name/value count being a count for a distinct name-value pair of a user-specified group name and value pair;
   receiving a Watch command on a first user-specified group name from a first client device, wherein the Watch command comprises a request to receive Join events for newly added values in the first user-specified group;
   receiving a first Join event from another discovery server, the first Join event including the first user-specified group name and a first value, wherein a Join event received from a particular discovery server comprises a notification of a Join command or a Join event being received by the particular discovery server;
   incrementing the group name/value count for the first group name and the first value in response to receiving the first Join event;
   determining that the group name/value count for the first group name and the first value transitioned from zero to nonzero in response to the discovery server incrementing the group name/value count for the first group name and the first value; and
   in response to determining that the group name/value count for the first group name and the first value transitioned from zero to nonzero in response to the discovery server incrementing the group name/value count for the first group name and the first value, sending a second Join event to the first client in response to the Watch command received from the first client on the first user-specified group name, the second Join event having the first value of the first Join event.

22. The computer program product of claim 21, wherein the operations further comprise:
   receiving an initial notification of the first group name from a first discovery server;
   issuing a Local Watch command on the first group name to the first discovery server, wherein the Local Watch command on the first group name is a request to receive Join events for the first group name from the first discovery server in response to the first discovery server receiving Join events for the first group name;
   receiving a third Join event from the first discovery server having, the third Join event having the first group name and the first value; and
   incrementing the group name/value count for the first group name and the first value pair in response to receiving the third Join event from the first discovery server.

23. The computer program product of claim 22, wherein the operations further comprise:
   determining that the first discovery server has failed; and in response to determining that the first discovery server has failed, decrementing the group name/value count for the first group name and the first value.

24. The computer program product of claim 21, wherein the operations further comprise:

receiving a Leave event from a second client device, the Leave event having the first user-specified group name and the first value; and decrementing the group name/value count for the first user-specified group name and the first value in response to receiving the Leave event having the first user-specified group name and the first value.

25. The computer program product of claim 24, wherein the operations further comprise:

determining that the group name/value count for the first user-specified group name and the first value is zero and that, before decrementing the group name/value count for the first user-specified group name and the first value in response to receiving the Leave event from the second client device, the group name/value count was nonzero;

determining that the Watch command on the first user-specified group name is pending; and sending a second Leave event having the first value to the first client device.

26. The computer program product of claim 21, wherein the operations further comprise providing a notification of the first group name to another discovery server using a metadata protocol, the metadata protocol being distinct from user-specified Join events and user-specified Leave events on user-specified group names.

27. The computer program product of claim 26, wherein providing the notification of the first group name to another discovery server using the metadata protocol comprises sending a metadata Join event to each other discovery server in the plurality of discovery servers, the metadata Join event having a reserved metadata group name and having a second value that includes the first group name.

28. The computer program product of claim 21, wherein the operations further comprise in response to receiving the Watch command from the first client device, sending, to the first client device, respective Join events having respective values of each nonzero group name/value count having the first group name.

29. The computer program product of claim 21, wherein the operations further comprise:

receiving a Local Watch command on the metadata group name from a second discovery server, wherein a Local Watch command on the metadata group name is a request issued to a particular discovery server to receive metadata Join events for the metadata group name from the particular discovery server in response to the particular discovery server receiving metadata Join events for the metadata group name; and in response to receiving the Local Watch command on the metadata group name from the second discovery server, issuing a respective Local Watch command on the metadata group name to every other discovery server of the plurality of discovery servers.

30. The computer program product of claim 29, wherein the operations further comprise:

determining that the first Join event includes a group name for a new user-specified group; and issuing a respective Local Watch command on the metadata group name to every other discovery server of the plurality of discovery servers, wherein a Local Watch command on the metadata group name is a request issued to a particular discovery server to receive metadata Join events for the metadata group name from the particular discovery server in response to the particular discovery server receiving metadata Join events for the metadata group name.

\* \* \* \* \*